(12) United States Patent
Zheng et al.

(10) Patent No.: US 8,814,380 B2
(45) Date of Patent: Aug. 26, 2014

(54) SYSTEM AND METHOD FOR LED LIGHT SOURCE

(75) Inventors: Anmin Zheng, Fremont, CA (US); Changming Gu, Shanghai (CN); Yao Zheng, Shanghai (CN); Rongzhuang Mao, Shanghai (CN); Fei Xiong, Shanghai (CN); Xiaohu Liu, Shanghai (CN)

(73) Assignee: Shanghai Foreal Optoelectronic Co., Ltd, Shanghai (CN)

(*) Notice: Subject to any disclaimer, the term of this patent is extended or adjusted under 35 U.S.C. 154(b) by 509 days.

(21) Appl. No.: 12/424,414

(22) Filed: Apr. 15, 2009

(65) Prior Publication Data
US 2009/0284965 A1    Nov. 19, 2009

Related U.S. Application Data

(60) Provisional application No. 61/045,540, filed on Apr. 16, 2008.

(30) Foreign Application Priority Data

May 28, 2008  (CN) .......................... 2008 1 0038143

(51) Int. Cl.
*F21V 9/00* (2006.01)
*G02B 27/14* (2006.01)
*G02B 27/10* (2006.01)
*G03B 21/14* (2006.01)
*F21Y 101/02* (2006.01)

(52) U.S. Cl.
CPC ............. *G03B 21/14* (2013.01); *F21Y 2101/02* (2013.01); *G02B 27/145* (2013.01); *G02B 27/1006* (2013.01); *G02B 27/149* (2013.01)
USPC ........................... 362/231; 362/293; 362/297

(58) Field of Classification Search
USPC .................... 362/293, 231, 297, 305; 359/634
See application file for complete search history.

(56) References Cited

U.S. PATENT DOCUMENTS

| | | | |
|---|---|---|---|
| 4,191,456 A * | 3/1980 | Hong et al. | 353/31 |
| 4,636,160 A * | 1/1987 | Nagasaka | 425/190 |
| 7,152,977 B2 * | 12/2006 | Ruda et al. | 353/37 |
| 7,400,439 B2 * | 7/2008 | Holman | 359/298 |
| 7,520,642 B2 * | 4/2009 | Holman et al. | 362/328 |
| 7,898,665 B2 * | 3/2011 | Brukilacchio et al. | 356/417 |
| 2002/0030793 A1 * | 3/2002 | Mihara | 353/31 |
| 2002/0113949 A1 * | 8/2002 | Sugawara | 353/31 |

* cited by examiner

*Primary Examiner* — Anabel Ton
(74) *Attorney, Agent, or Firm* — Kilpatrick Townsend & Stockton LLP (57) ABSTRACT

System and method for LED light source. According to an embodiment, the present invention provides a an LED light system for emitting substantially white light. The system includes a first dichroic element, the first dichroic element comprises a first dichroic surface having a first coating, the first coating being adapted to reflect over 95% of a first color and transmit over 95% of a second color, the first dichroic surface having a first side and a second side. The system also includes a second dichroic element, the second dichroic element comprises a second dichroic surface having a second coating, the second coating being adapted to reflect over 95% of a third color and transmit 95% of a fourth color, the second dichroic surface having a third side and a fourth side.

28 Claims, 7 Drawing Sheets

SYSTEM AND METHOD FOR LED LIGHT SOURCE

CROSS-REFERENCES TO RELATED APPLICATIONS

This application claims priority to U.S. Provisional Applications No. 61/045,540 filed Apr. 16, 2008 and Chinese Patent Application No. 200810038143.6 filed May 28, 2008, and both of which are herein incorporated by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present application is directed to a system and method for generating a balanced LED light source, such as white light source. More specifically, embodiments of the present invention provide a high-brightness and white-balanced light source using individual red, green, and blue (RGB) LED emitters. For example, the LED light sources according to the present invention can be used for a variety of applications such as laboratory test equipment lighting, project display lighting, and others. In various embodiments of the present invention, LED light sources have been processed by optical components. In a specific embodiment, an LED light is formed by combining two or more color LEDs, and can be operated in continuous, pulsed, and/or modulated mode. There are other applications and implementations as well, as explained below.

Since the days of Thomas Edison, electrically powered lighting system has been an important application in daily life. The idea of incandescent light is still used today. For example, halogen lights is a type of popular incandescent lights used today. Another type of popular lighting method involves arc lamp in which light is produced by an electric arc.

While both halogen lamps and arc lamps are used for conventional lightings, they are often inadequate for specific applications. For example, arc lamps or incandescent halogen lamps are not among the best choice for illuminating samples in laboratory testing. Both arc lamp and halogen lamp cannot be quickly turned on and off, due to significant warm-up and cool-down periods. In addition, these types of lamp often post the risk of electrode damage in some cases. Moreover, these conventional lamps have relatively short life times.

Lasers are another type of light source that can be used. However, laser light sources usually provide narrow and collimated beams and laser light often has speckling artifacts which are not suitable for certain applications. Additionally, laser light sources are relatively expensive.

In contrast to arc lamps and incandescent halogen lamps, light emitting diode (LED) lights can be turned on and off in a very short time. With advent of this technological breakthrough, the potential brightness level of LED is increasing every day. The efficiency of LED light can be similar to traditional light sources, but often more efficient.

The advantages of using LED as light source include, but are not limited, (1) no IR or UV from LED lights (due to its narrow bandwidth); (2) no moving parts in the system, (3) instant On/Off, (4) small size, (5) low weight, (6) long Life (over 20,000 hours), (7) low voltage, (8) no mercury, and (9) unlikely to cause explosions. Therefore, the design and adaptation of LED illumination systems can be much simpler and less expensive but offer advanced performance with more functions.

For a LED light to be useful in certain applications, such as lighting samples in a laboratory, the LED light needs to emit light that has proper white-balance. For example, a sample might not be viewed correctly if the LED light casts an artificial color onto the sample. Thus, various conventional techniques have been proposed, but they are often inadequate. In many precision instruments where light output or brightness (Lumens) within limited area and working angle (collectively called Etendue) is required, the requirement on extracting and collimating as well as equalizing light from the LED emitters becomes extremely critical.

Therefore, an improved system and method for generating white balanced LED light source is desired.

BRIEF SUMMARY OF THE INVENTION

The present application is directed to a system and method for a generating white balanced LED light source. More specifically, embodiments of the present invention provide high-brightness and white-balanced light source using R, G, and B LED lights. For example, the LED light sources according to the present invention can be used for a variety of applications, such as laboratory test equipment lighting, projection display lighting, and others. In various embodiments of the present invention, LED light sources have been processed by optical components. In a specific embodiment, an LED light is formed by combining two or more color LEDs, and can be operated in continuous, pulsed, and/or modulated modes. There are other applications and implementations as well, as explained below.

According to the embodiments, the present invention provides a lighting system where red and blue LED lights are combined first using a first prism, and the combined light is further combined with a green LED light using a second prism, and a white light is then produced from the second prism.

In an embodiment, the present invention provides a system that includes an LED red-blue light channel, a LED green light channel, and a dichroic plate. The LED red-blue light channel contains a prism rod, dichroic prism, and relay lens. The LED green light channel contains a prism rod and relay lens and the red, blue and green lights projected through the two channels are combined into white light by the dichroic plate.

According to an embodiment, the present invention provides a an LED light system for emitting substantially white light. The system includes a first dichroic element, the first dichroic element comprises a first dichroic surface having a first coating, the first coating being adapted to reflect over 95% of a first color and transmit over 95% of a second color, the first dichroic surface having a first side and a second side. The system also includes a second dichroic element, the second dichroic element comprises a second dichroic surface having a second coating, the second coating being adapted to reflect over 95% of a third color and transmit 95% of a fourth color, the second dichroic surface having a third side and a fourth side. The system further includes a first light channel, the first light channel including a first LED light source and a first light guide, the first LED light source being characterized by the first color, the first light guide being configured to project a first light from the first LED light source onto the first side at approximately 45 degrees angle. Additionally, the system includes a second light channel, the second light channel including a second LED light source and a second light guide, the second LED light source being characterized by the second color, the second light channel being substantially perpendicular to the first light channel, the second light guide being configured to project a second light from the second LED light source onto the second side at approximately 45 degrees angle. The system includes a third light channel, the third light channel including a third LED light source and a third light guide, the third LED light source being characterized by the third color. The system includes a first relay optical element, the first relay optical element being adapted to transmit a combined light from the first dichroic element onto a predetermined location of the third side at approximately 45 degrees angle, the combined light being characterized by the fourth color, the combined light comprises a the first light reflected by the first side and the second light transmitted through the second side. Also, the system includes a second relay optical element for transmitting a light from the third light channel onto the fourth side at approximately 45 degrees angle.

According to yet another embodiment, the present invention provides an LED light system for emitting substantially white light. The system includes a first dichroic element, the first dichroic element comprises a first dichroic surface having a first coating, the first coating being adapted to reflect a first color and transmit of a second color, the first dichroic surface having a first side and a second side. The system includes a second dichroic element, the second dichroic element comprises a second dichroic surface having a second coating, the second coating being adapted to reflect a third color and transmit a fourth color, the second dichroic surface having a third side and a fourth side. The system also includes a first light channel, the first light channel including a first LED light source and a first light guide, the first light guide being less 0.5 mm away from the first dichroic element, the first LED light source being characterized by the first color, the first light guide being configured to project a first light from the first LED light source onto the first side at approximately 45 angle. Also, the system includes a second light channel, the second light channel including a second LED light source and a second light guide, the second LED light source being characterized by the second color, the second light channel being substantially perpendicular to the first light channel, the second light guide being configured to project a second light from the second LED light source onto the second side at approximately 45 degrees angle. Furthermore, the system includes a third light channel, the third light channel including a third LED light source and a third light guide, the third LED light source being characterized by the third color. Also, the system includes a first relay optical element, the first relay optical element being adapted to transmit a combined light from the first dichroic element onto a predetermined location of the third side at approximately 30 degrees angle, the combined light being characterized by the fourth color, the combined light comprises a the first light reflected by the first side and the second light transmitted through the second side. The system also includes a second relay optical element for transmitting a light from the third light channel onto the fourth side at approximately 30 degrees angle.

According to yet another embodiment, the present invention provides an LED light system for emitting combined light. The system includes a first LED light source, the first LED light source being adapted to emit a first light, the first light being associated with a first color. The system includes a second LED light source, the second LED light source being adapted to emit a second light, the second light being associated with a second color. The system also includes a third LED light source, the third LED light source being adapted to emit a third light, the third light being associated with a third color. Also, the system includes a first optical element, the first optical element adapted to reflect the first light. The system includes a second optical element, the second optical element includes a first dichroic surface, the first dichroic surface is adapted to transmit the reflected first light and deflect the second light. The system also includes a third optical element, the third optical element includes a second dichroic surface, the second dichroic surface is adapted to transmit a combined light and deflect the third light, the combined light being a combination of the first light and the second light.

According to yet another embodiment, the present invention provides an LED light system for emitting substantially white light. The system includes a first dichroic element, the first dichroic element comprises a first dichroic surface having a first coating, the first coating being adapted to reflect over 95% of a first wavelength and transmit over 95% of a wavelength, the first dichroic surface having a first side and a second side. The system includes a second dichroic element, the second dichroic element comprises a second dichroic surface having a second coating, the second coating being adapted to reflect over 95% of a third and transmit 95% of a fourth, the second dichroic surface having a third side and a fourth side. The system includes a first light channel, the first light channel including a first LED light source and a first light guide, the first LED light source being characterized by the first, the first light guide being configured to project a first light from the first LED light source onto the first side at approximately 45 degrees angle. The system includes a second light channel, the second light channel including a second LED light source and a second light guide, the second LED light source being characterized by the second, the second light channel being substantially perpendicular to the first light channel, the second light guide being configured to project a second light from the second LED light source onto the second side at approximately 45 degrees angle. The system includes a third light channel, the third light channel including a third LED light source and a third light guide, the third LED light source being characterized by the third The system includes a first relay optical element, the first relay optical element being adapted to transmit a combined light from the first dichroic element onto a predetermined location of the third side at approximately 45 degrees angle, the combined light being characterized by the fourth, the combined light comprises a the first light reflected by the first side and the second light transmitted through the second side. The system includes a second relay optical element for transmitting a light from the third light channel onto the fourth side at approximately 45 degrees angle.

Compared with conventional systems, the embodiments provide many advantages. Since LED red, blue and green light are all able to be projected into the beam-splitting films of dichroic prism and dichroic plate at angles of less than 45°, it is possible for a light system that is cheaper, compared to conventional techniques, by using beam-splitting film. Among other things, the use of the beam-splitting film according to embodiments of the present invention decreases the relative aperture required, thereby allowing the production of dichroic prism and dichroic plate to be easier and less costly. In addition, used together, the light guides and relay lens in various embodiments are used to effectively compress the divergence angle of light projection in LED chips and at the same time enhance both the combined color uniformity of the white light projected from dichroic plate and the light energy utilization rate. Also, red and blue lights share a group of relay lenses in certain embodiments, and they are identical to those for the green light. LED red, blue and green light is projected by dichroic plate from two directions and combined into white light, which makes the optical system simpler and more compact in structure. There are other benefits as well.

DETAILED DESCRIPTION OF THE INVENTION

The present application is directed to a system and method for LED light sources. More specifically, embodiments of the present invention provide high-brightness and white-balanced light source using individual RGB LED emitters. For example, the LED light sources according to the present invention can be used for a variety of applications, such as laboratory test equipment lighting, projection display lighting, and others. In various embodiments of the present invention, LED light sources have been processed by optical components. In a specific embodiment, an LED light is formed by combining two or more color LEDs, and can be operated in continuous, pulsed, and/or modulated mode. There are other applications and implementations as well, as explained below.

As explained above, LED light sources that provide proper white balance are desired. Typically, LED color is determined by the underlying semiconductor material used for the LED light. For example, aluminum gallium arsenide typically produces red LED, zinc selenide material produces blue light, etc. To produce white light (i.e., broad spectrum), a blue/UV diode with yellow phosphor is often used.

Figure 1:
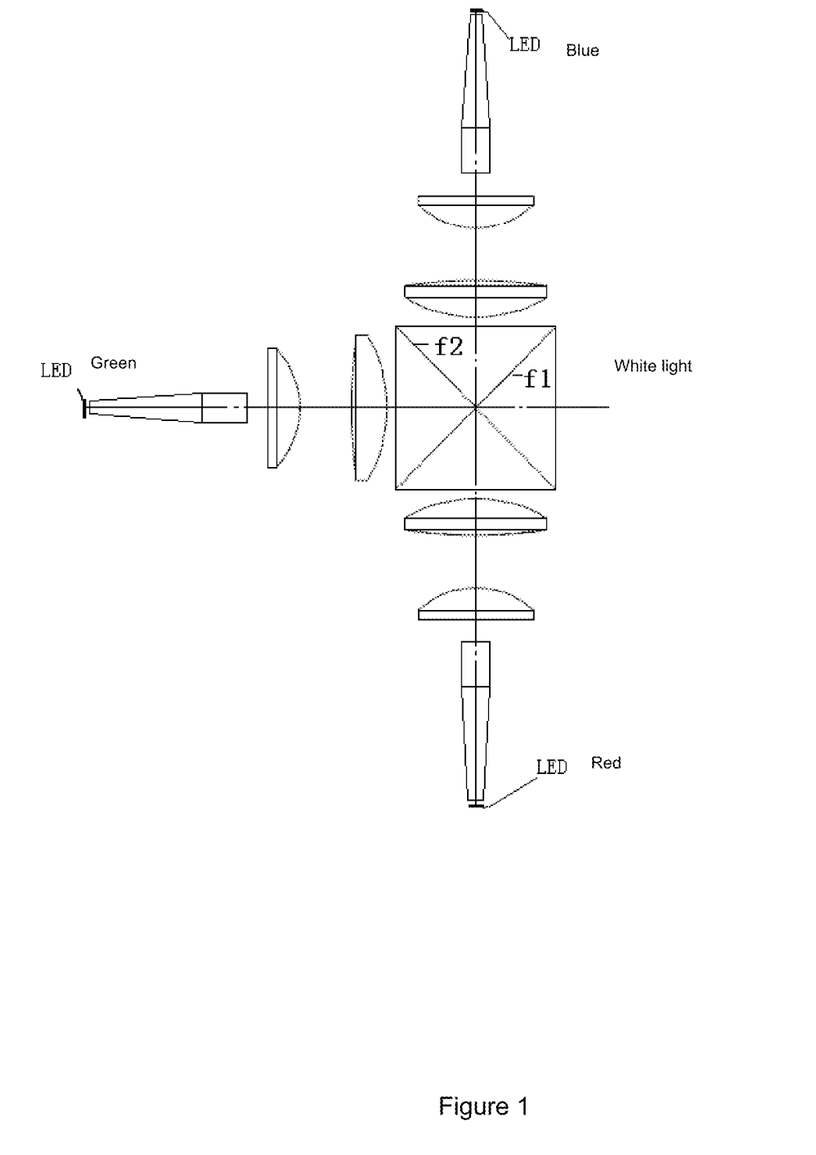
FIG. 1 is a diagram demonstrating the structure of a conventional triple-channel color combining system for red, green and blue LED light.

FIG. 1 is a simplified diagram of a conventional LED light source. The red LED light is guided by a light guide and projected through an X-Cube after passing through two lenses. For example, the X-Cube includes 4 prisms that are aligned against one another at angles of about 45 degrees. Similarly, the green LED light is guided by a light guide and projected through the X-Cube after passing through two lenses; the blue LED light is guided by a light guide and projected through the X-Cube after passing through two lenses. FIG. 1 is a diagram demonstrating the structure of conventional a triple-channel color combining system for red, green, and blue LED light. The light mixer shown in FIG. 1 includes an X-Cube that multiplexes the red, green, and blue lights. The combination of red, green, and blue lights results in a white light.

The X-Cube includes two dichroic coatings, f1 and f2, that are orthogonal to each other. The filtering coating f1 is positioned within the prism to reflect red light and allow green and blue light to pass through. The filtering coating f2 is adapted to reflect blue light and allow red and green light to pass through. When the red, green, and blue light are projected from three separate directions to the X-Cube, they are combined into a white light by the filtering coatings f1 and f2. For example, filter coatings are dichroic coatings.

The white light produced by combining red, green, and blue LED lights using the system above is suitable for many applications, especially as a light source for display systems. However, a system using red, green, and blue light sources with an X-Cube is typically expensive and difficult to manufacture. Among other things, since each of the red, green, and blue lights is respectively projected onto the filter coatings f1 and f2 at about 45 degrees angles, accurate alignment is required, thereby requiring a small tolerance. Typically, the 45 degrees entering angle for LED lights imposes a challenge in coating manufacturing, as the usable aperture from the filter coating is relatively small, even more so when LED light is used. For example, if the filter coatings are not properly manufactured, the angles for the entering light have narrow range and the efficiency for light transmission is low. Additionally, the X-Cubes are typically manufactured by gluing four rectangular shaped prisms together, and such manufacturing processes are expensive, which translate to higher costs of the system. Moreover, certain applications have geometry restriction so X-Cube type of system may not be suitable.

Therefore, it is to be appreciated the embodiments of the present invention provide systems in which red, green, and blue LED lights are efficiently combined, and the systems are cheaper and more efficient compared to the conventional system described above. In addition, the systems have a relatively more compact structure and are cheaper to be manufactured compared to conventional systems. The detailed description of the systems according to the present invention is provided below.

Figure 2:
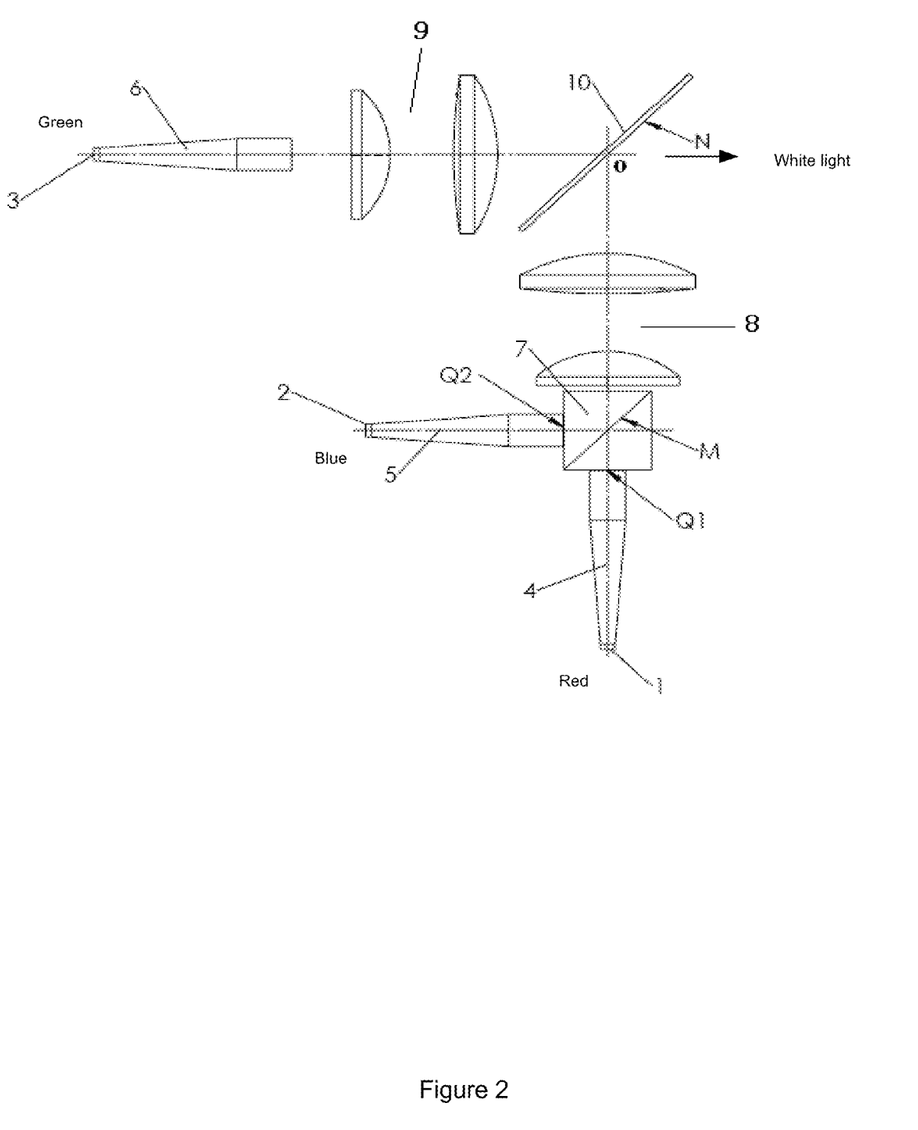
FIG. 2 is a simplified diagram demonstrating the structure of a dual-channel color combining system for red, green and blue LED light according to an embodiment of the present invention.

Compared with prior art, the embodiments of the invention provide many advantages:

1. LED red, blue and green lights are all able to be projected into the beam-splitting films of dichroic prism 7 and dichroic plate 10 at angles of less than 45°, which helps to reduce difficulties in the production of beam-splitting film and increase the relative aperture thereof, which in turn makes the production of dichroic prism 7 and dichroic 10 easier and less costly.

2. The red light prism rod 4, blue light prism rod 5, green light prism rod 6, red-blue relay lens 8 and green relay lens 9 can effectively compress the divergence angle of light projection in LED chips and at the same time enhance both the combined color uniformity of the white light projected from dichroic plate 10 and transmission efficiency.

3. LED red and blue lights share a group of relay lenses, which are identical to those for the green light. LED red, blue and green light is projected by dichroic plate 10 from two directions and combined into white light, which makes the optical system simpler and more compact in structure.

There are numerous other advantages as well, as evident and described through the description of the present invention.

FIG. 2 is a diagram demonstrating the structure of a dual-channel color combining system for red, green and blue LED light according to an embodiment of the present invention. This diagram is merely an example, which should not unduly limit the scope of the claims. One of ordinary skill in the art would recognize many variations, alternatives, and modifications.

As shown in FIG. 2, an LED light system includes the following components:
1. a red LED chip 1;
2. blue LED chip 2;
3. green LED chip 3;
4. red light guide 4;
5. blue light guide 5;
6. green light guide 6;
7. dichroic prism 7;
8. red-blue relay lens 8;
9. green relay lens 9; and
10. dichroic plate 10.

As shown in FIG. 2, a LED light system according to an embodiment of the present invention operates in a dual-channel color combining configuration. The green channel includes a green light LED chip 3, green light guide 6, and green light relay lens 9. Depending on the application, the green light guide 6 may be implemented using various types of apparatus, such a prism rod that is characterized by a pyramidal shape. The green light relay lens 9 may, as shown in FIG. 2, include 2 lens elements. Depending on the applications, there can be fewer or more lens elements. For example, the green relay lens 9 is used for properly aligning the green light onto the dichroic plate 10.

As shown in FIG. 2, the LED light system includes red and blue channels, whose lights are combined first before projected onto the dichroic plate 10. The red light channel contains a red light LED chip 1, and red light guide 4. For example, the red light guide, similar to the green light guide 6, is comprised of a prism rod. The blue channel includes blue light LED chip 2 and blue light guide 5 (e.g., prism rod). For example, the prism rod may be made in various types of transparent material, such as glass, etc. According to an embodiment, the light guide 4 is approximately 0.1 mm from the dichroic prism 7 at the location Q1. It is to appreciated that a gap (e.g., air gap) between the light guide 4 and the prism 7 is need to ensure to allow light to exist from the light guide 4 and enter the prism 7. In various embodiment, the gap between the light guide 4 and the prism 7 various from 0.0001 mm to about 0.15 mm. For example, while it is desirable to have a narrower gap, smaller gap size usually means less manufacturing tolerance and high cost.

The red light channel and blue light channel are combined by the dichroic prism 7. In a specific embodiment, the dichroic prism 7 comprises two adhesively joined prisms at the section M shown in FIG. 2. For example, the section M is coated with a beam-splitting film that transmits red light but reflects blue light. As a result, the transmitted red light and the reflected blue light are combined.

The combined light passes through the and red-blue relay lens 8. Depending on the applications, the relay lens 8 may include fewer or more lens elements than that shown in FIG. 2. For example, the relay lens 8 is used to properly align the combined blue-red light onto the dichroic plate 10 as shown in FIG. 2.

The dichroic plate 10 is coated on one face with a beam-splitting film N that reflects red and blue light but transmits green light. Thus, the transmitted green light is combined with the reflected red-blue light, producing a white light as shown.

The red light LED chip 1, the red light guide 4, the dichroic prism 7, the red-blue relay lens 8, and dichroic plate 10 are arranged in sequence as illustrated in FIG. 2. The optical axis of the red light LED chip 1, red light guide 4, dichroic prism 7 and red-blue relay lens 8 coincide with one another and at an angle of 45° to the face N of the dichroic plate 10. For example, the red light LED chip 1 and red light guide 4 can be together viewed as the red light channel.

The blue light LED chip 2, blue light guide 5 and dichroic prism 7 are arranged in sequence, with the optical axis of the blue light LED chip 2, blue light guide 5. In a specific embodiment, for example, the blue light LED chip 2 and blue light guide 5 can be viewed together as the blue light channel. The blue light channel is substantially perpendicular to the red channel. According to an embodiment, the light guide 5 is approximately 0.1 mm away from the dichroic prism 7 at the location Q2.

The green light LED chip 3, green light guide 6 (e.g., implemented using a prism rod), and green relay lens 9 are aligned line in substantially a straight line, which is substantially perpendicular to the red light channel. For example, the green relay lens 9 may consist one or more lens elements to properly align green light onto the dichroic plate 10. As shown in FIG. 2, the green light is projected onto the point "o" of the dichroic. It is to be appreciated that the light guide 6 and the green relay lens 9 allow the green light to be aligned at the point "o" of the dichroic. As explained above, the combined blue-red light is aligned and projected on the point "o" of the dichroic. It is to be appreciated that the alignment of light onto the point "o" of the dichroic plate 10 is essential for the purpose of producing white light. In a specific embodiment, the point "o" is positioned at the center of the dichroic.

In the channel for red-blue light illumination, the red and blue light projected by red LED chip 1 and blue LED chip 2 respectively, enter the red light guide 4 and blue light guide 5 at a certain divergence angle. According to an embodiment, the divergence angle is approximately 30 degree when certain taper types of light guides are used. For example, the red light guide 4 and blue light guide 5 are able to compress the light divergence angle.

The combined red and blue light are then projected to dichroic plate 10 by dichroic prism 7 and relay lens 8. Coming out of the dichroic prism, the combined red light and blue light share a single light channel and a single group of relay lenses 8.

The light projected through relay lens 8 is reflected by dichroic plate 10; the green light emitted from green LED chip 3 in the other channel enters a green light guide 6 at a certain divergence angle. The green light guide 6 is able to compress the light divergence angle. For example, the light divergence angle is approximately 30 degree when certain taper types of light guides are used. The green light then passes through green relay lens 9 and the dichroic plate 10. The red, blue and green light from the two channels are combined into white light by dichroic plate 10.

The surface "M" of dichroic prism 7 is coated with a beam-splitting film that allows it to transmit red light but reflect blue light. As a result, LED red and blue light are combined when projected to dichroic plate 10 through the relay lens 8. Face N of dichroic plate 10 is coated with beam-splitting film that allows it to reflect red and blue light but transmit green light. The reflected red and blue light and transmitted green lights are combined into white light when they are projected onto the dichroic.

Figure 3:
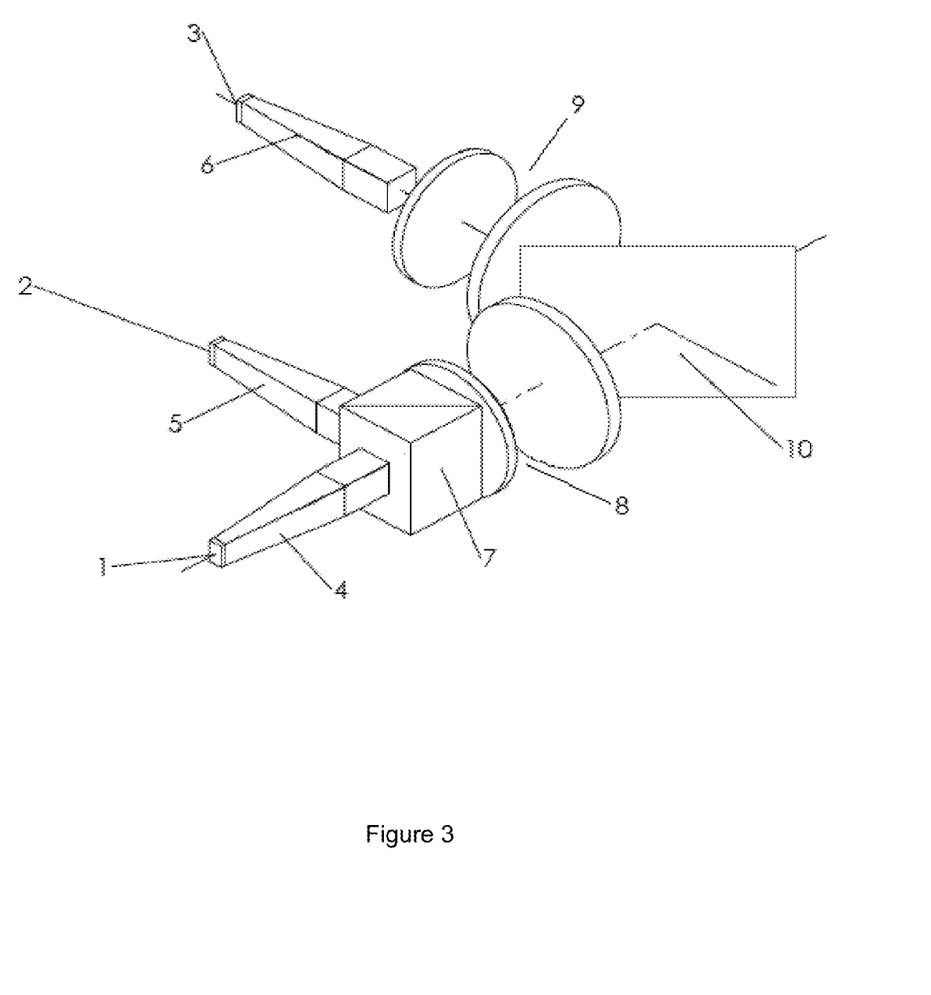
FIG. 3 is a simplified diagram showing a physical embodiment of a dual-channel color combining system for red, green and blue LED light according to an alternative embodiment of the present invention.
Figure 4:
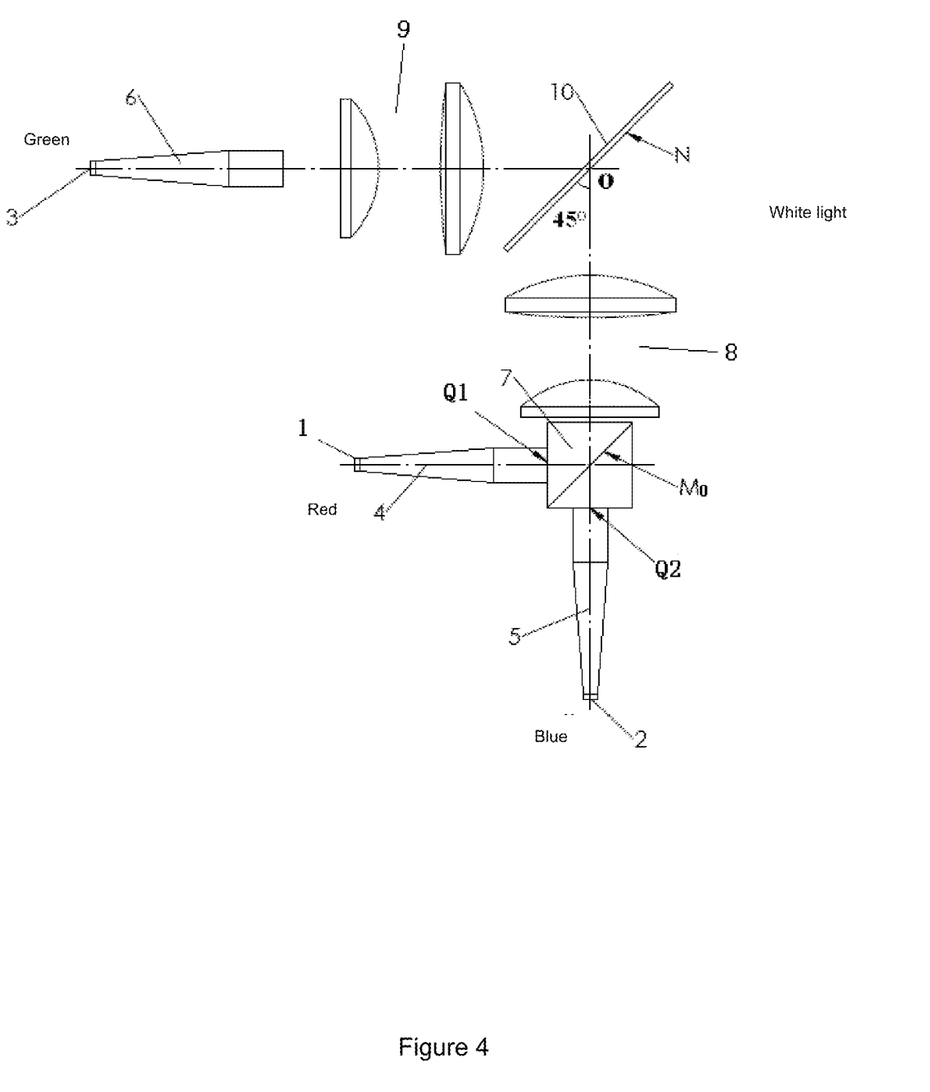
FIG. 4 is a simplified diagram demonstrating the structure of the dual-channel color combining system for red, green and blue LED light according to according to an alternative embodiment of the present invention.

FIG. 3 is a simplified diagram providing an alternative view of the dual-channel color combining system for red, green and blue LED light of FIG. 2. This diagram is merely an example, which should not unduly limit the scope of the claims. One of ordinary skill in the art would recognize many variations, alternatives, and modifications FIG. 4 is a simplified diagram illustrating a structure of the dual-channel color combining system for red, green and blue LED light according to an alternative embodiment. This diagram is merely an example, which should not unduly limit the scope of the claims. One of ordinary skill in the art would recognize many variations, alternatives, and modifications. As shown in FIG. 4, the system includes a layer of beam-splitting film $M_0$. According to an embodiment, the beam-splitting film $M_0$ is on a coupling section of the dichroic prism 7, which consists of two parts that are joined and coupled together at the location of the beam-splitting film $M_0$ as shown. The beam-splitting film $M_0$ has the property of transmitting blue light and reflecting red light. In another embodiment, and position of the red light LED chip is exchanged with that of the blue light LED chip.

Figure 5:
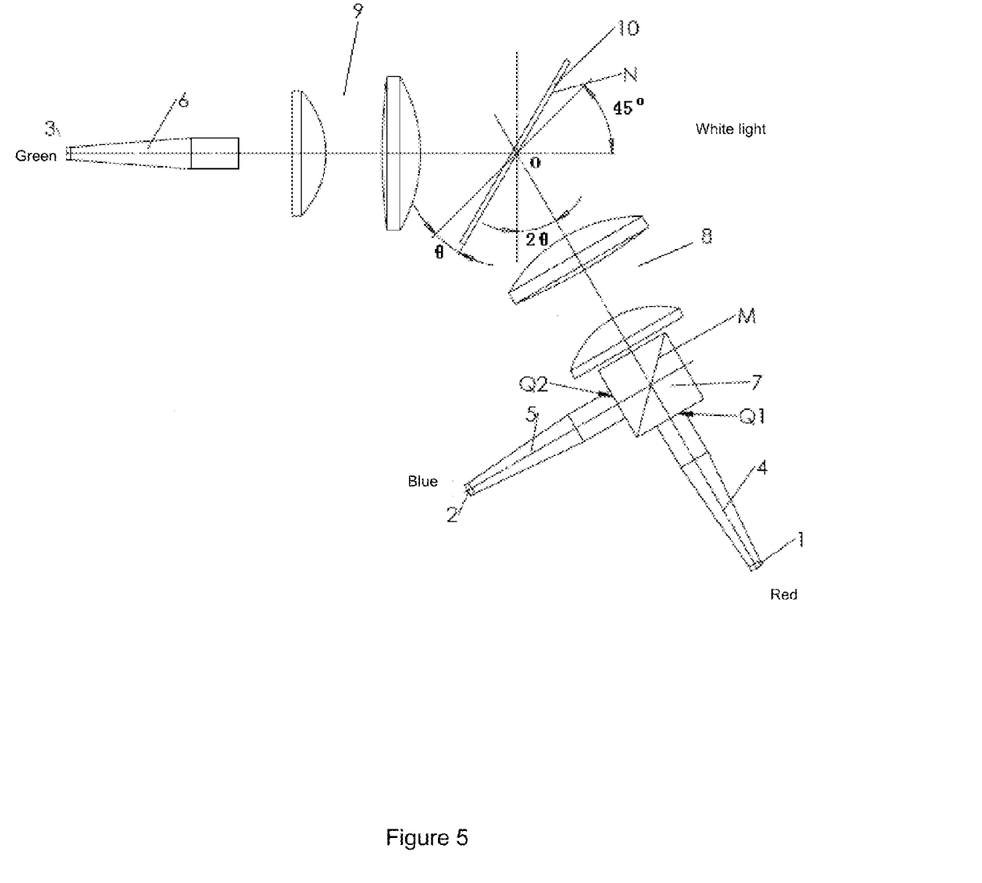
FIG. 5 is a simplified diagram demonstrating the structure of the dual-channel color combining system for red, green and blue LED light according to an alternative embodiment of the present invention.

FIG. 5 is a simplified diagram illustrating a structure of the dual-channel color combining system for red, green and blue LED light according to an alternative embodiment. This diagram is merely an example, which should not unduly limit the scope of the claims. One of ordinary skill in the art would recognize many variations, alternatives, and modifications. As shown in FIG. 5, a system according to an embodiment of the present invention includes substantially similar components illustrated in FIG. 2 and described above. In various embodiment, the face "N" of dichroic plate 10 is respectively receiving green light from the green light channel from the left and the combined light resulting from the red and blue channels at approximately 60~120 degree angles.

In a specific embodiment, the light guide 4 is approximately 0.1 mm away from the dichroic prism 7 at Q1. Similarly, the light guide 5 is approximately 0.1 mm away from the dichroic prism 7 at Q2. As explained above, if the light guide 4 is connected to the dichroic prism 7, the light is spread out and the Etendue thereof becomes unacceptable for various applications. In various embodiment, the gap distance at Q1 and Q2 is about the same, thereby allowing the light to be correctly aligned.

Figure 6:
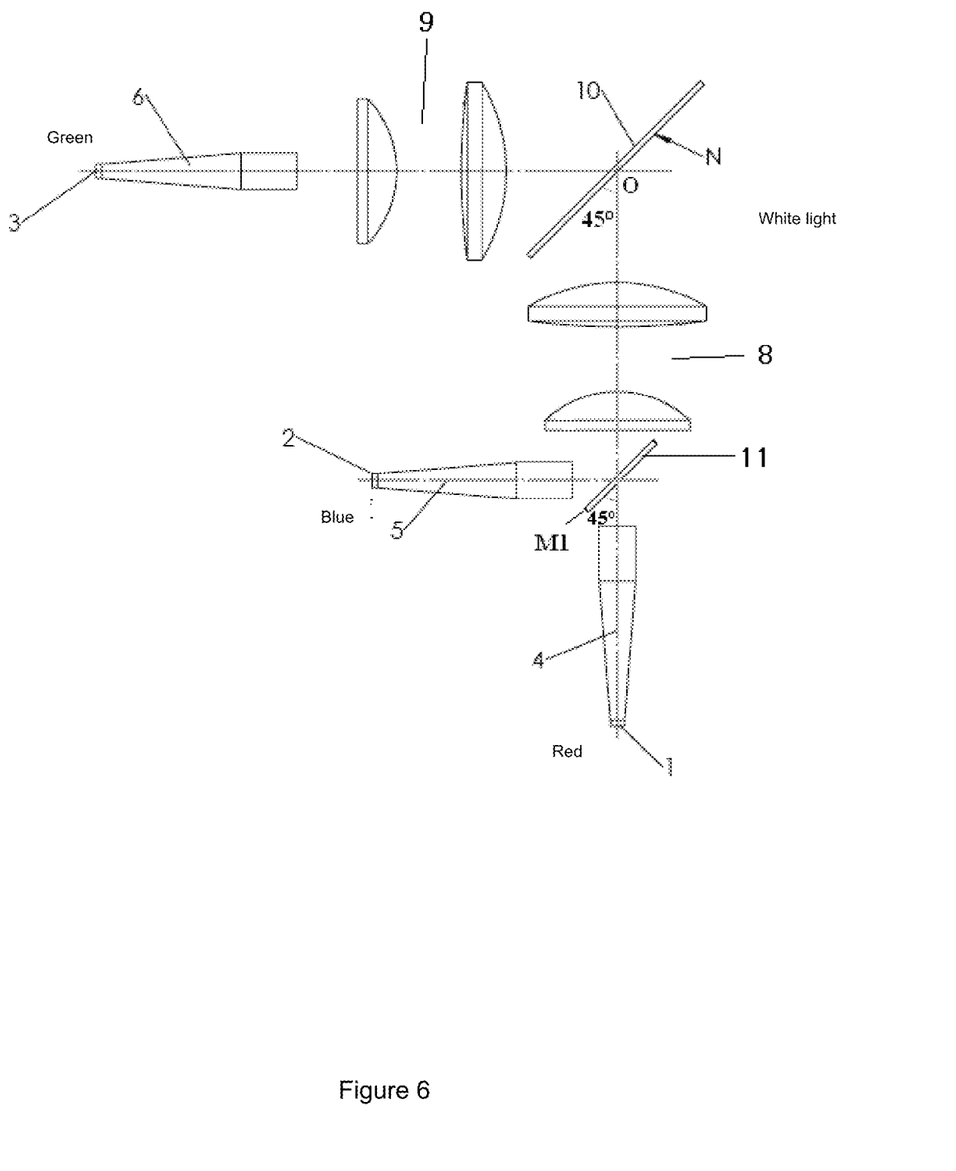
FIG. 6 is a simplified diagram demonstrating the structure of the dual-channel color combining system for red, green and blue LED light according to an alternative embodiment of the present invention.

FIG. 6 is a simplified diagram illustrating a structure of the dual-channel color combining system for red, green and blue LED light according to an alternative embodiment. This diagram is merely an example, which should not unduly limit the scope of the claims. One of ordinary skill in the art would recognize many variations, alternatives, and modifications. As shown in FIG. 6, a system according to an embodiment of the present invention includes substantially similar components illustrated in FIG. 2 and described above. However, instead of the dichroic prism 7, a dichroic plate 11 is used. For example, the dichroic plate has a coating that allows it to transmit red light and reflect a blue light.

Figure 7:
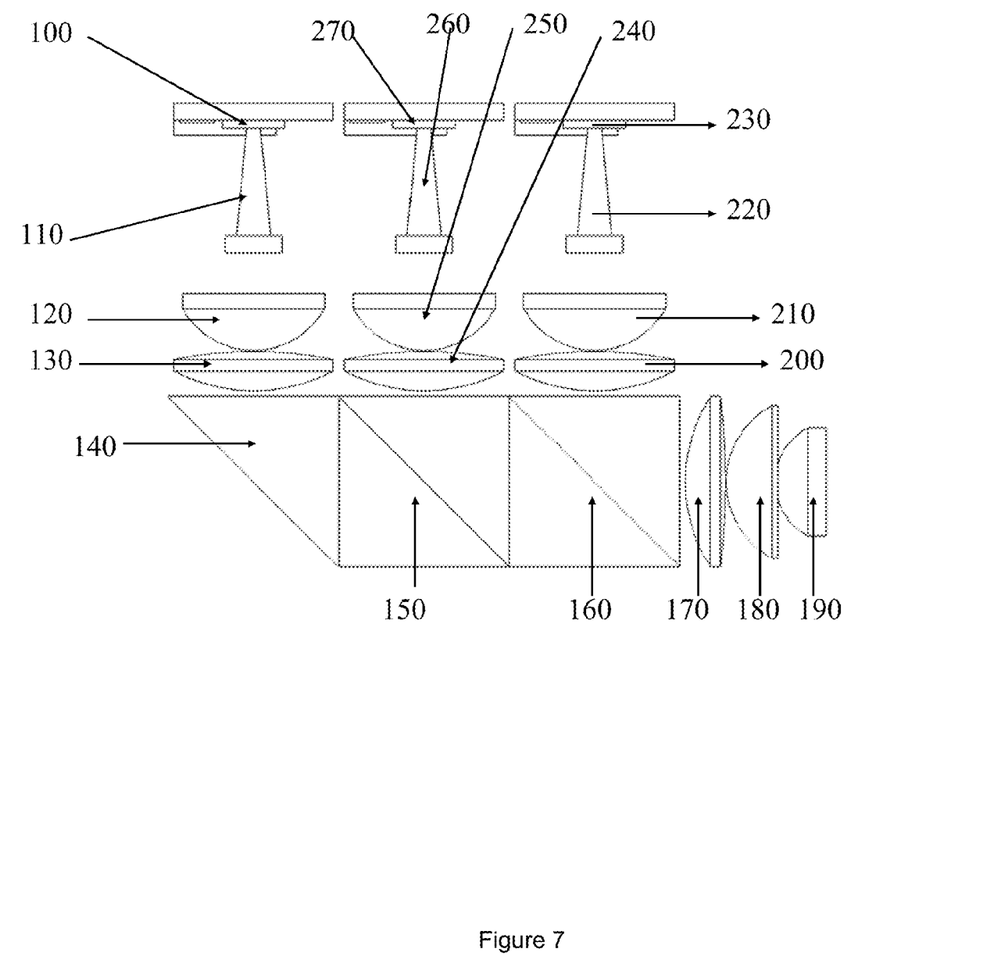
FIG. 7 is a simplified diagram demonstrating the structure of the dual-channel color combining system for red, green and blue LED light according to an alternative embodiment of the present invention.

FIG. 7 is a simplified diagram illustrating a structure of the dual-channel color combining system for red, green and blue LED light according to an alternative embodiment. This diagram is merely an example, which should not unduly limit the scope of the claims. One of ordinary skill in the art would recognize many variations, alternatives, and modifications.

As shown in FIG. 7, a light system includes a light guide 110. For example, the light guide 110 can be a tapered pyramid that has a hollow light-tunnel that is characterized by a high reflection on all the interior walls which light travels along. The light guide 110 can also be a solid light-pipe to utilize the total reflection. For a solid light-pipe, the in/out end surfaces can have anti-reflection coatings in the working wavelength region. For example, the dimension of the in/out end surfaces and the length of pyramid determines the light cone angle (F#) and the Etendue so that the dimension of in-surface and out-surface of light guide 110 are different. Depending on the application, the shape of the light guide can be square, rectangular, elliptical, octagonal, and/or round. Within the light guide 110, there can be other optical parts in order to improve the utilization of LED light.

A red LED source is placed within the light guide 110, positioned close to the in-end surface.

Similarly, light guides 220 and 260 function like the light guide 110 to respectively collect and couple light from LED sources 230 and 270.

Light from the LED 100 is collected and coupled onto the dichroic prism 140 by the light guide 110, and lenses 120 and 130. Similarly, light from the LED 230 is collected and coupled onto the dichroic cube 160 by the light guide 220 and lenses 210 and 200. Light from the LED 270 is collected and coupled onto the dichroic cube 150 by light guide 260 and lenses 250 and 240.

The prism 140 reflects light from the LED 100. According an embodiment, only red light is reflected by the prism 140.

The dichroic cube 150 transmits light coming out of the prism 140 (which reflects light from the LED 100) and reflects light from LED 270. For example, red light coming out of the prism 140 is transmitted and the green light from the LED 270 is reflected.

The dichroic cube 160 transmits a combined light (combination of red and green light) received from the dichroic cube 150 and reflects light from the LED 230. For example, the LED 230 is a blue LED light.

The light coming out of the dichroic cube 160 is essentially white light, which is a combination of red, green, and blue light from the LEDs. As shown in FIG. 7, relay lenses (i.e., 120, 130, 250, 240, 210, 200, 170, 180, and 190) are employed to make sure that light from the LED and the dichroic cubes are projected to a desired area. For example, lights of different colors need to be aligned for color combination to take place.

It is to be appreciated that the system illustrated in FIG. 7 and described above may be modified to combine additional light. For example, to accommodate more light, an additional dichroic cube with the right dichroic property may be added (e.g., to the right of the dichroic cube 160), thereby combining the output from the dichroic cube 160 with an additional light source. In such manner, more than one light sources and dichroic cubes may be added.

According to embodiments, the present invention provides a lighting system where red and blue LED lights are combined first using a first prism, and the combined light is combined with a green LED light using a second prism, and a white light is produced from the second prism.

Mores specifically, the red and blue LED lights are projected to the first prism through light guides respectively for red and blue LED lights. After the red and blue lights are combined by the first prism, the combined light then passes through two relay lenses and is projected on to the second prism. The second prism combines the red-green light combination and the blue light, which is projected to the second prism first through a light guide and then two relay lenses. The resulting light from the second prism is a white light.

In a specific embodiment, red, green, and blue LED lights are combined using two prisms. The system includes a green LED source and a green LED light guide. For example, the green LED light source is part of the green LED light guide and the green LED light guide is characterized by a pyramid shape. A green light is projected from the green LED light guide onto one or more relay lenses. The system also includes red and blue light guides, and the light guides respectively include red and blue LED light sources. For the example, the red and blue light guide is characterized by a pyramid shape, which is similar to the shape of the green LED light guide. The red and blue light is combined by a first prism that is designed to combine two red and green lights. For example, the first prism includes dichroic filtering coatings. For example, the first prism includes a coating for that allows red light to pass but reflects blue light.

In an embodiment, the present invention provides a type of dual-channel color combining system for red, green and blue LED lights. The system includes a LED green light channel which contains a green light LED chip, green light guide (e.g., implemented using a prism rod), and green light relay lenses.

The system also includes an LED red and blue light channel and a dichroic. The LED red and blue light channel contains a red light LED chip, red light prism rod, blue light LED chip, blue light prism rod, a dichroic prism and red-blue relay lens.

The dichroic prism has an adhesively joined portion, which is coated with a beam-splitting film that transmits red light but reflects blue light.

The dichroic is coated on one face with a beam-splitting film that reflects red and blue light but transmits green light The red light LED chip, red light prism rod, dichroic prism, red-blue relay lens and dichroic are arranged in a specific configuration. In this configuration, the optical axis of the red light LED chip, red light prism rod, dichroic prism and red-blue relay lens coincide with one another and at an angle of about 45° to the face of the dichroic.

The blue light LED chip, blue light prism rod and dichroic prism are arranged in sequence, with the optical axis of the blue light LED chip, blue light prism rod and dichroic prism coinciding with one another. The dichroic prism is perpendicular to those of the red light prism rod and red-blue relay lens.

The green light LED chip, green light prism rod, green relay lens and dichroic are arranged in sequence, with the optical axis of the green light LED chip, green light prism rod and green relay lens coinciding with one another and perpendicular to those of the red light prism rod, dichroic prism and red-blue relay lens. The point of intersection between the optical axis of green light LED chip, green light prism rod, green relay lens and that of the red light prism rod, dichroic prism and the red-blue relay lens is centered on the surface of the beam-splitting film of the dichroic.

The beam-splitting film on the adhesively joined section of the dichroic prism is a beam-splitting film that transmits blue light but reflects red light. The installation position of the red light LED chip can be interchanged with that of the blue light LED chip.

The face of the dichroic can be located anywhere around its own center in a counterclockwise direction by an angle of θ, wherein, 0°≤θ≤15°, the red light LED chip, red light prism rod, dichroic prism, red-blue relay lens, together with their optical axis, are rotated around the center point of the dichroic face in a counterclockwise direction by an angle doubling the value of said θ angle.

The present invention is further characterized in that said beam-splitting film on the adhesively joined section of the dichroic prism transmits blue light but reflects red light, and the installation position of the red light LED chip can be interchanged with that of the blue light LED chip; the face of the dichroic is rotated around its own center in a counterclockwise direction by an angle of θ, wherein, 0°≤θ≤15°, the blue light LED chip, blue light prism rod, dichroic prism, red-blue relay lens, together with their optical axis, are rotated around the center point of the dichroic face in a counterclockwise direction by an angle doubling the value of said θ angle.

The present invention is further characterized in that between the red light prism rod, blue prism rod and dichroic prism are a first air-gap and second air-gap respectively, with the widths of said first air-gap and the second air-gap are 0.01-0.15 mm.

The present invention is further characterized in that the dichroic prism is replaced by the first dichroic, wherein, one of the faces of the first dichroic is coated with a beam-splitting film that transmits red light but reflects blue light, and the intersection angle between the film coated face of the first dichroic and of the axis of the red light LED chip, red light prism rod, and red-blue relay lens is 45°.

In the drawings and descriptions provided above, exemplary systems are illustrated to produce white light using red, green, and blue LED light sources. However, it is to be appreciated that various embodiments of the present invention have wide range of applications. In addition to producing a white light, the embodiments of the present invention also allow users to produce other light colors. For example, by selectively turning on and/or off red, green and blue LED lights, it is possible to have red, green, or blue (or the combination or two or more lights) lights focus on the same spot while switching from one light color to another. In certain applications, lights of specific wavelength can be used to produce desired light output. For example, LED with wavelength of approximately 380 nm, 410 nm, 460 nm, 500 nm, 525 nm, 575 nm, 615 nm, 655 nm, and 705 nm cane be used as LED light source and later produce desired wavelength. In certain embodiments, invisible lights (e.g., UV, IR) are combined. It is to be appreciated that other wavelengths can be used as light source as well to produce desired output. Specific dichroic lens are used for combining light. For example, to combine lights of wavelength 380 nm and 410 nm, a dichroic lens that transmit 380 nm and reflect 410 nm wavelength is used.

Depending on the application, the LED source may be operated in continuous, pulsed, and/or modulated mode for use in various types of instruments.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An LED light system for emitting substantially white light, the system comprising:
    a first dichroic element, the first dichroic element comprises a first dichroic surface having a first coating, the first coating being adapted to reflect over 95% of a first color and transmit over 95% of a second color, the first dichroic surface having a first side and a second side;
    a second dichroic element, the second dichroic element comprises a second dichroic surface having a second coating, the second coating being adapted to reflect over 95% of a third color and transmit 95% of a fourth color, the second dichroic surface having a third side and a fourth side;
a first light channel, the first light channel including a first LED light source and a first light guide, the first LED light source being characterized by the first color, the first light guide being configured to project a first light from the first LED light source onto the first side at approximately 45 degrees angle;
a second light channel, the second light channel including a second LED light source and a second light guide, the second LED light source being characterized by the second color, the second light channel being substantially perpendicular to the first light channel, the second light guide being configured to project a second light from the second LED light source onto the second side at approximately 45 degrees angle;
a third light channel, the third light channel including a third LED light source and a third light guide, the third LED light source being characterized by the third color;
a first relay optical element, the first relay optical element being adapted to transmit a combined light from the first dichroic element onto a predetermined location of the third side at approximately 45 degrees angle, the combined light being characterized by the fourth color, the combined light comprises a the first light reflected by the first side and the second light transmitted through the second side; and
a second relay optical element for transmitting a light from the third light channel onto the fourth side at approximately 45 degrees angle.

2. The system of claim 1 where in the first color is red, the second color is blue, and the third color is green.

3. The system of claim 1 where in the first color is red, the second color is green, and the third color is blue.

4. The system of claim 1 where in the first color is blue, the second color is green, and the third color is red.

5. The system of claim 1 wherein first color is blue, the second color is red, and the third color is green.

6. The system of claim 1 wherein first color is green, the second color is red, and the third color is blue.

7. The system of claim 1 wherein first color is green, the second color is blue, and the third color is red.

8. The system of claim 1 wherein the light guide is characterized by a divergence angle of about 30 degree.

9. The system of claim 1 wherein the second dichroic element is rotatable.

10. The system of claim 1 wherein the first dichroic element comprises an adhesive portion, the adhesive portion being used to couple the first side and the second side.

11. The system of claim 1 where in the first light is projected onto an essentially center region of the first side, and the second light is onto an essentially a central region of the second side.

12. The system of claim 1 wherein the first dichroic element comprises a dichroic prism, an end of the first light guide being approximately 0.1 mm from the dichroic prism, an end of the second light guide being approximately 0.1 mm from the dichroic prism.

13. The system of claim 1 wherein the second dichroic element comprises a dichroic coating.

14. The system of claim 1 wherein the first relay optical element comprises two lenses.

15. The system of claim 1 wherein the second relay optical element comprises two lenses.

16. The system of claim 1 wherein the first light guide comprises a prism rod.

17. The system of claim 1 wherein the first light guide is characterized by a pyramidal shape.

18. The system of claim 1 wherein the first light guide comprises essentially glass material.

19. The system of claim 1 wherein the first light guide comprises essentially elastomeric material.

20. The system of claim 1 wherein the first light guide is coupled to the first LED light source.

21. The system of claim 1 wherein the first LED light sources comprises an LED chip.

22. An LED light system for emitting substantially white light, the system comprising:
a first dichroic element, the first dichroic element comprises a first dichroic surface having a first coating, the first coating being adapted to reflect a first color and transmit of a second color, the first dichroic surface having a first side and a second side;
a second dichroic element, the second dichroic element comprises a second dichroic surface having a second coating, the second coating being adapted to reflect a third color and transmit a fourth color, the second dichroic surface having a third side and a fourth side;
a first light channel, the first light channel including a first LED light source and a first light guide, the first light guide being less 0.5 mm away from the first dichroic element, the first LED light source being characterized by the first color, the first light guide being configured to project a first light from the first LED light source onto the first side at approximately 45 angle;
a second light channel, the second light channel including a second LED light source and a second light guide, the second LED light source being characterized by the second color, the second light channel being substantially perpendicular to the first light channel, the second light guide being configured to project a second light from the second LED light source onto the second side at approximately 45 degrees angle;
a third light channel, the third light channel including a third LED light source and a third light guide, the third LED light source being characterized by the third color;
a first relay optical element, the first relay optical element being adapted to transmit a combined light from the first dichroic element onto a predetermined location of the third side at approximately 30 degrees angle, the combined light being characterized by the fourth color, the combined light comprises a the first light reflected by the first side and the second light transmitted through the second side; and
a second relay optical element for transmitting a light from the third light channel onto the fourth side at approximately 30 degrees angle.

23. An LED light system for emitting combined light, the system comprising:
a first LED light source, the first LED light source being adapted to emit a first light, the first light being associated with a first color;
a second LED light source, the second LED light source being adapted to emit a second light, the second light being associated with a second color;
a third LED light source, the third LED light source being adapted to emit a third light, the third light being associated with a third color;
a first optical element, the first optical element adapted to reflect the first light;

a second optical element, the second optical element includes a first dichroic surface, the first dichroic surface is adapted to transmit the reflected first light and deflect the second light;

a third optical element, the third optical element includes a second dichroic surface, the second dichroic surface is adapted to transmit a combined light and deflect the third light, the combined light being a combination of the first light and the second light; and a plurality of relay lenses.

24. An LED light system for emitting combined light, the system comprising:

a first LED light source, the first LED light source being adapted to emit a first light, the first light being associated with a first color;

a second LED light source, the second LED light source being adapted to emit a second light, the second light being associated with a second color;

a third LED light source, the third LED light source being adapted to emit a third light, the third light being associated with a third color;

a first optical element, the first optical element adapted to reflect the first light;

a second optical element, the second optical element includes a first dichroic surface, the first dichroic surface is adapted to transmit the reflected first light and deflect the second light;

a third optical element, the third optical element includes a second dichroic surface, the second dichroic surface is adapted to transmit a combined light and deflect the third light, the combined light being a combination of the first light and the second light; and a fourth optical element and a fourth LED light source, the fourth optical element includes a third dichroic surface, the second dichroic surface is adapted to transmit a combined light and deflect the third light, the combined light being a combination of the first light and the second light.

25. An LED light system for emitting combined light, the system comprising:

a first LED light source, the first LED light source being adapted to emit a first light, the first light being associated with a first color;

a second LED light source, the second LED light source being adapted to emit a second light, the second light being associated with a second color;

a third LED light source, the third LED light source being adapted to emit a third light, the third light being associated with a third color;

a first optical element, the first optical element adapted to reflect the first light a second optical element, the second optical element includes a first dichroic surface, the first dichroic surface is adapted to transmit the reflected first light and deflect the second light;

a third optical element, the third optical element includes a second dichroic surface, the second dichroic surface is adapted to transmit a combined light and deflect the third light, the combined light being a combination of the first light and the second light; and wherein the combined light is substantially white.

26. An LED light system for emitting substantially white light, the system comprising:

a first dichroic element, the first dichroic element comprises a first dichroic surface having a first coating, the first coating being adapted to reflect over 95% of a first wavelength and transmit over 95% of a wavelength, the first dichroic surface having a first side and a second side;

a second dichroic element, the second dichroic element comprises a second dichroic surface having a second coating, the second coating being adapted to reflect over 95% of a third and transmit 95% of a fourth, the second dichroic surface having a third side and a fourth side;

a first light channel, the first light channel including a first LED light source and a first light guide, the first LED light source being characterized by the first, the first light guide being configured to project a first light from the first LED light source onto the first side at approximately 45 degrees angle;

a second light channel, the second light channel including a second LED light source and a second light guide, the second LED light source being characterized by the second, the second light channel being substantially perpendicular to the first light channel, the second light guide being configured to project a second light from the second LED light source onto the second side at approximately 45 degrees angle;

a third light channel, the third light channel including a third LED light source and a third light guide, the third LED light source being characterized by the third wavelength;

a first relay optical element, the first relay optical element being adapted to transmit a combined light from the first dichroic element onto a predetermined location of the third side at approximately 45 degrees angle, the combined light being characterized by the fourth, the combined light comprises a the first light reflected by the first side and the second light transmitted through the second side; and a second relay optical element for transmitting a light from the third light channel onto the fourth side at approximately 45 degrees angle.

27. The system of claim 26 wherein the first, second, and third LED source being adapted to be selectively turned on or off to produce a fourth wavelength.

28. The system of claim 26 wherein three wavelengths are approximately at about 380 nm, 410 nm, 460 nm, 500 nm, 525 nm, 575 nm, 615 nm, 655nm, or 705 nm.

* * * * *